United States Patent

[11] 3,624,596

[72] Inventors Harry R. Dickenson
East Elmhurst;
George S. Hamilton, St. Albans, both of N.Y.
[21] Appl. No. 18,087
[22] Filed Mar. 10, 1970
[45] Patented Nov. 30, 1971
[73] Assignee Sona Labs, Inc.
Brooklyn, N.Y.

[54] ULTRASONIC RANGE-ATTENUABLE DEPTH-MEASURING SYSTEM
7 Claims, 14 Drawing Figs.

[52] U.S. Cl. .................................................. 340/3 R
[51] Int. Cl. .................................................. G01s 9/68
[50] Field of Search .......................................... 340/1, 3

[56] References Cited
UNITED STATES PATENTS

| | | | |
|---|---|---|---|
| 3,061,812 | 10/1962 | Rachwalski .................. | 340/1 X |
| 3,351,895 | 11/1967 | Cupp et al. ................... | 340/3 |
| 3,548,370 | 12/1970 | Hoxsie .......................... | 340/3 |
| 3,102,991 | 9/1963 | Jess ............................... | 340/3 |

*Primary Examiner*—Richard A. Farley
*Attorney*—Matthew M. Russo

ABSTRACT: An ultrasonic depth-measuring system wherein a highly accurate pulse-generating timing circuit having voltage compensation provides a keying signal for Hartley-type oscillator whose output is applied to an underwater transducer. A portion of the transmitter output is also applied to the receiver, lockout circuit, and to a variable-range attenuator which effectively attenuates the receiver input inversely proportional to the range squared. The receiver output is amplified and detected and applied to one input of a NOR gate. The lockout circuit detects the transmitter output and provides a lockout logic signal to the NOR gate and the flip-flop connected to the NOR gate output to reset the flip-flop. The output of the lockout is an RC discharge which blocks the receiver output until the discharge voltage has decreased below a predetermined value. The flip-flop in turn controls the time duration of a current generator (e.g., from transmit pulse to received echo) whose current is integrated and applied to the meter for indication of depth.

PATENTED NOV 30 1971

INVENTORS.
HARRY R. DICKENSON
GEORGE S. HAMILTON

INVENTORS.
HARRY R. DICKENSON
GEORGE S. HAMILTON

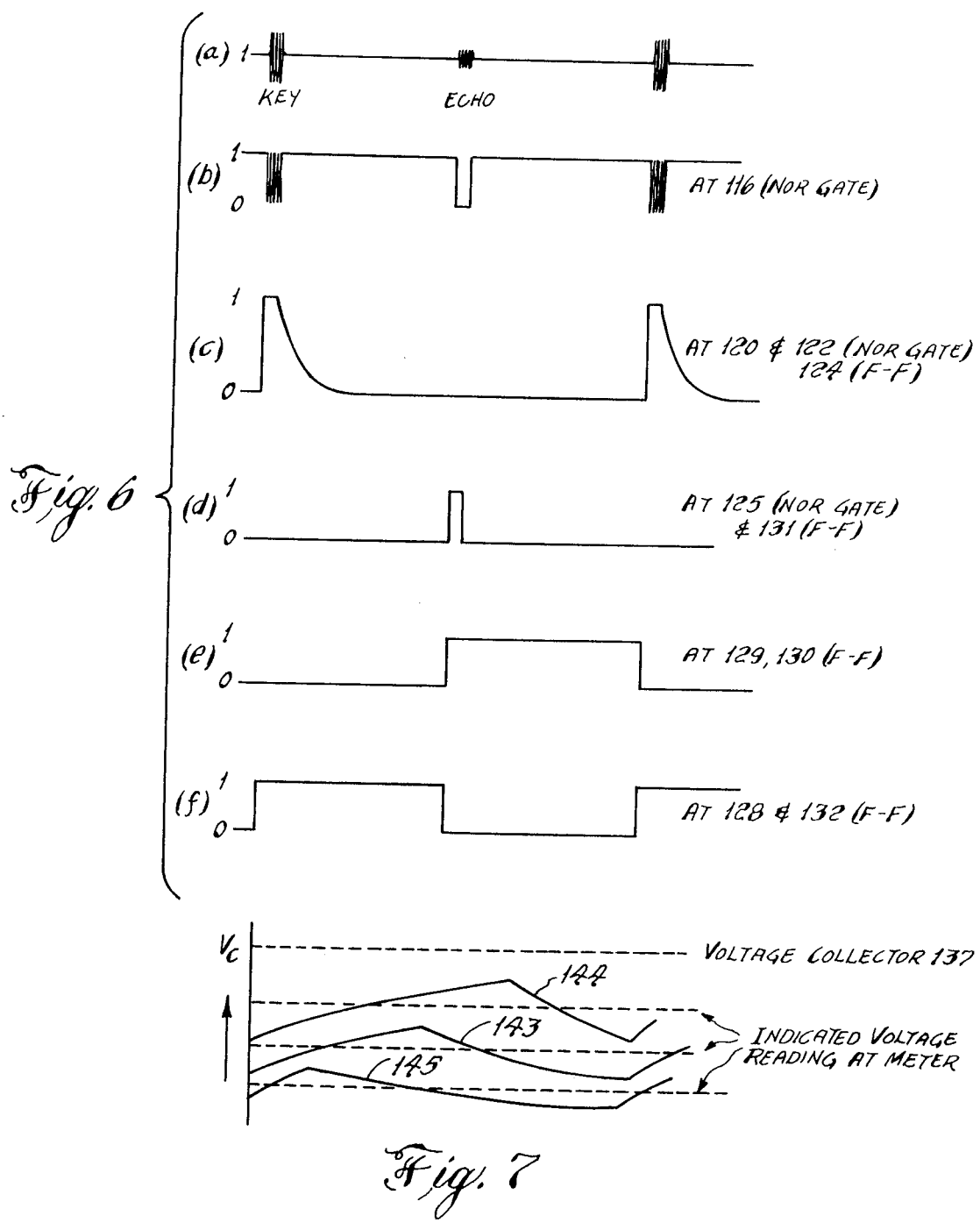

3,624,596

ULTRASONIC RANGE-ATTENUABLE DEPTH-MEASURING SYSTEM

BACKGROUND OF THE INVENTION

1. F FIELD OF THE INVENTION

The present invention relates to apparatus for measuring the distance between two positions generally, a ship, and the bottom of a body of water by accurately determining the transit time of an ultrasonic transmitted pulse in travelling through the media as a propogated wave and returning as an echo. More particularly, however, it pertains to improvements in such apparatus wherein the accuracy of the timing pulses is independent of voltage variations and the returning echo signal is selectively attenuated inversely proportional to the square of the range. Additionally logic circuits are employed to initiate and terminate a current which is integrated and provides the meter deflection. The range sensitivity may be varied by the operator thus permitting the location of fish and other objects off the bottom, determining the type of bottom surface, as well as depth.

2 DESCRIPTION OF THE PRIOR ART

In the field of ultrasonic depth findings, it has been the general practice to initiate and transmit via an underwater transducer a series of time-spaced high-power ultrasonic pulses. The time between these projected pulses being such that a returning echo will be received therebetween for the particular depth range. The time interval (transmit-receive) is measured and since it is directly proportional to range, the depth is read directly on a meter. Such devices, which are presently in common use, have proved unsatisfactory in many regards, one of which relates to the fact that spurious echoes are induced by various objects in the water. These spurious echoes are induced by various objects in the water. These spurious echoes are generated by silt, particles carried by the water, submerged articles, fish and soft or muddy bottoms and they tend to provide erroneous depth values as well as causing the meter indication to vibrate or waver. The instant invention overcomes this difficulty as well as others commonly encountered in present day equipment.

SUMMARY OF THE INVENTION

The general purpose of this invention is to provide a depth-measuring apparatus that has all the advantages of similarly employed prior art devices but has none of the above described disadvantages. To attain this, the present invention provides a unique range-attenuation circuit in which a portion of the transmitted pulse charges an RC circuit through a diode. At the termination of the pulse the capacitor commences to discharge through a variable resistor network and the base emitter of an emitter follower. The emitter current is directed through a resistor and another diode which is connected across the receiver input. Since the diode resistance is proportional to the current therethrough the receiver attenuation will be inversely proportional to the square of the range dependent on the discharge rate set by the variable resistor. Additionally, the invention provides unambigious logic circuitry for controlling the activation of a current generator whose output is integrated in a temperature-compensated circuit and thereafter applied to a meter.

An object of the present invention is to provide an ultrasonic pulse distance-measuring apparatus which permits variation of range sensitivity while maintaining high accuracy and reliability of the pulse timing independently of transmitter load and source parameters.

Another object is to provide a reliable, accurate, low power consuming, simple, lightweight, compact and inexpensive depth finder which employs solid-state and integrated circuitry.

Still another object is the provision of a dual-range depth finder which is capable of permitting the operator to quickly differentiate false bottom indications and to locate underwater objects as well as fish.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIGS. 6a–f are graphic representations of the various logic states of the NOR gate and bistable means terminal; and FIG. 7 is a representation of the general wave shape of the voltage applied to the indicating meter.

BRIEF DESCRIPTION OF THE PREFERRED EMBODIMENT

Figure 1:
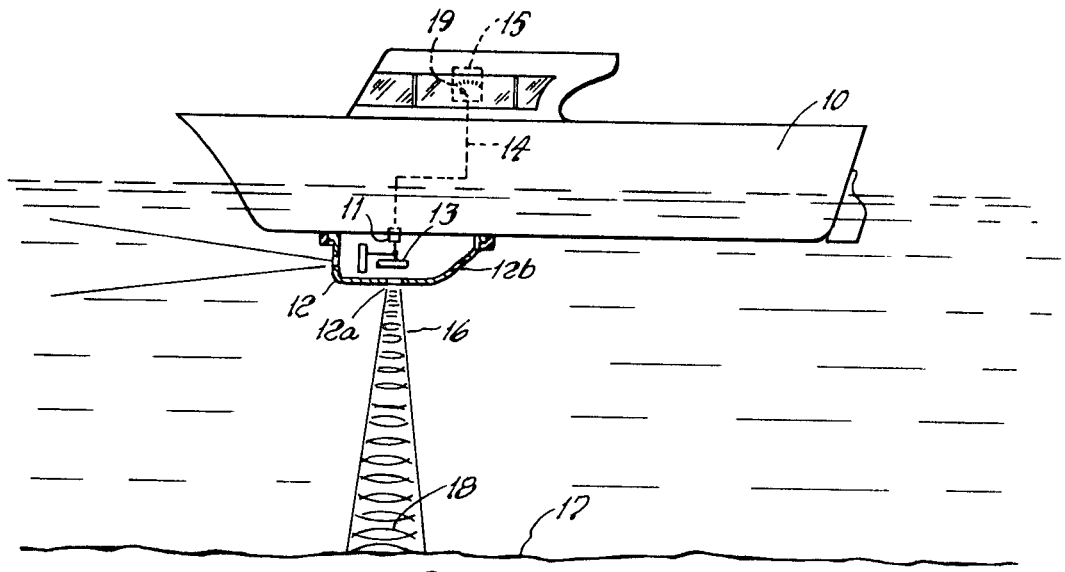
FIG. 1 is perspective view of a ship equipped with the present invention.

In embodiment of FIG. 1 a ship or boat 10 is provided with a hull aperture 11 amidships proximate the keel through which passes a cable 14 which is sealed therein. The cable 14 extends into a free-flooding streamlined fairing 12 which is provided with an aperture 12a below depth transducer 13 supported therein and a vent opening 12b. The fairing material is void-free resin-impregnated fiber glass about ¼ wavelength thick and secured to the hull with a rubber gromet therebetween. Another transducer 13a is directed forward and both transducers may be of the ceramic piezoelectric type. Barium titanate (PZT–4) crystals and similar varieties have been found most suitable especially when they are coated with an antifouling nonmetallic paint. Multiconductor transducer cable 14 connects the transducers directly to the depth finder 15 or some other sensor which is located at some convenient place near the ship's bridge or control system. In operation, a high-frequency electrical pulse signal is generated at the depth finder 15 and is converted into a sonar or high-frequency acoustic signal by the transducer and applied to the surrounding water. The transmitted acoustic pulse signal 16 travels downwardly since the one transducer is so directed, and strikes some object of a density different from water. In this case it is the sea bottom 17 although it could be a school of fish, a foreign object, or a layer of loose mud. Upon striking the bottom, the acoustic energy 18 is reflected upwardly and finally impinges on the transducer where the returning echo signal is converted into an electrical signal which is fed into the depth finder. Since the acoustic signal travels at a constant speed (approximately 4,900 ft./sec.) the elapsed time between the transmitted pulse and the return echo is a measure of the distance travelled by the acoustic pulse. This is presented in terms of "feet" directly on the meter 19 of the depth-finder instrument 15.

Figure 2:
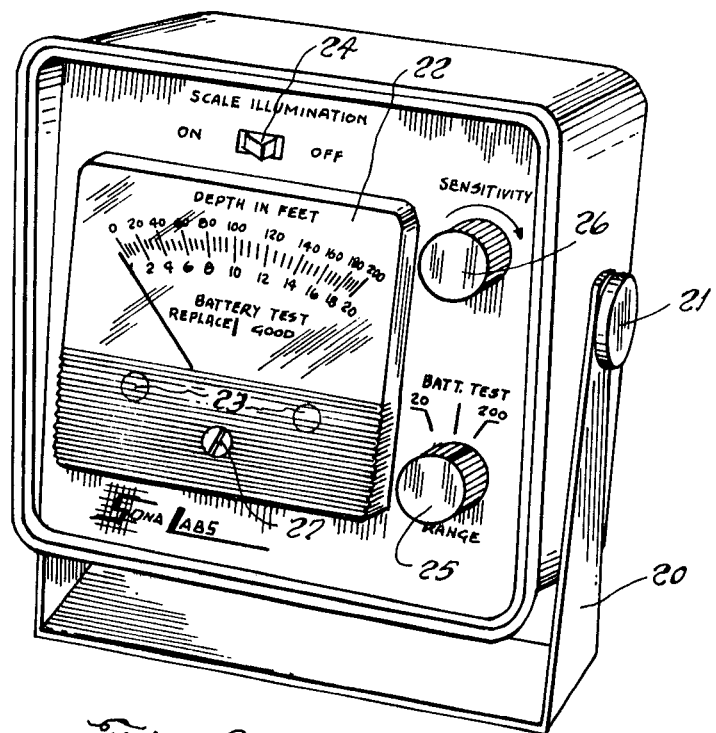
FIG. 2 is a perspective of a depth finder made in accordance with the present invention.

The depth-finder instrument shown in FIG. 2 which enclosed in a shock resistant housing is carried between the arms of a "U" mounting bracket 20 and can be angularly adjusted by thumb screws 21. The meter face 22 is calibrated in two scales (0–20, 0–200 feet) and is illuminated by a pair of colored bulbs 23 via switch 24. The range is set by switch 25 which also may be set for "battery test." The depth sensitivity is adjusted by switch 26 while a meter adjust is provided by screw control 27.

Figure 3:
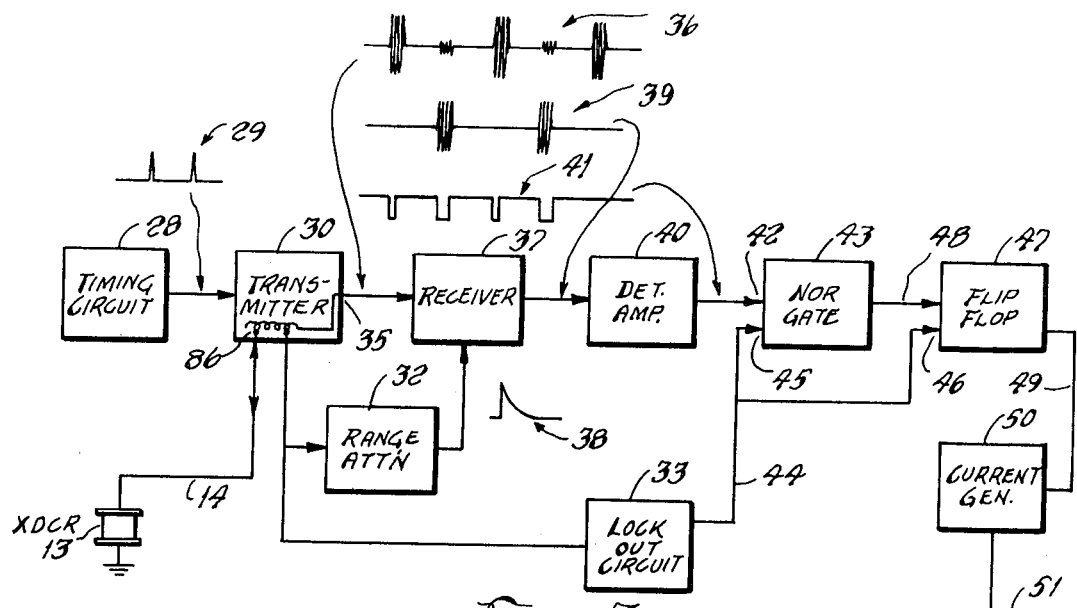
FIG. 3 is a block diagram illustrating an embodiment made in accordance with the principle of this invention.
Figure 3A:
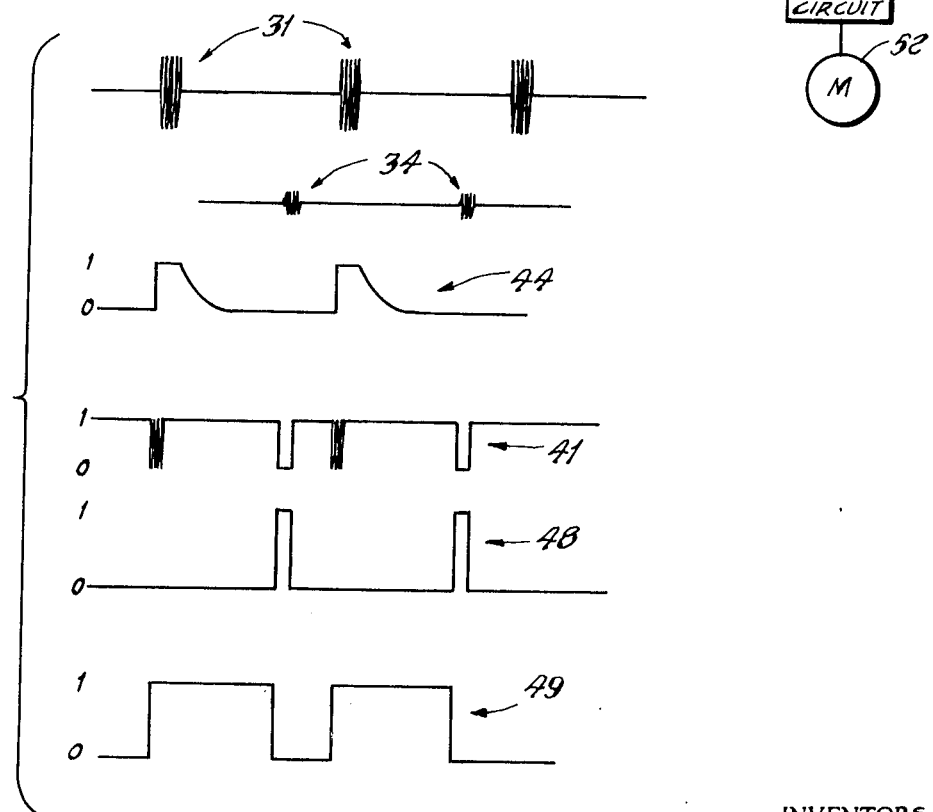
fig. 3a illustrates the wave shapes at various points of the embodiment of FIG. 3

Referring now to FIG. 3, a series of accurately spaced-apart narrow pulses are generated by the pulse timing circuit 28. The pulse period is fixed for two settings to correspond with the dual depth ranges. The timing pulses 29 are applied to the transmitter 30 which is basically a high-gain high-power oscillator of a modified Hartley type. The oscillator is triggered "on" by the start of the timing pulse 29 and remains in oscillation only approximately for the duration of the timing pulse so that effectively the transmitter output is a series of high or radio frequency pulses 31 which are applied via cable 14 to the transducer 13. Similar pulses, but of lower magnitude, are applied to the variable range attenuator 32 and the lockout circuit 33. Since the return echo signal 34 which is time displaced from the transmitted signal is also received through the transducer 13, the transmitter output 35 is connected directly to the receiver and both transmitted and echo signals 36 are applied to the receiver 37. The range attenuator 32 effectively attenuates the input to the receiver 37 during the transmitted pulse and thereafter attenuates in accordance with the setting selected as by the slope of 38. The receiver 37 amplifies only the return echo signal as at 39 and applies it to a detector amplifier 40.

The output 41 from the detector amplifier 40 is normally one of high output which in logic terminology may be referred to as a "1" as opposed to no signal or a "0." When the receiver applies a signal to the amplifier 40, such as during the echo, the output therefrom switches to a "00." until the signal terminates. This binary logic output is applied to one input 42 of NOR-gate 43. The lockout circuit 33 provides another "logic" output 44 which is effectively at "1" for the duration of the transmitted pulse and for a time equivalent to an acoustic signal travelling to a depth of 1.5 feet and returning and then decays to "0" prior to the receipt of the echo signal. This output 44 is applied to the other input 45 of NOR-gate 43 and to one input 46 of flip-flop means 47. The output 48 of the NOR-gate 43 remains at "0" except at the time the echo is received when it goes to "1" since both inputs thereto are at "0." The transmitted signal does not change the NOR-gate output since lockout circuit prevents this by remaining at "1" during this period and locks out the transmitted pulse. The flip-flop or bistable means 47 is normally set to provide an output of "1" with the start of the transmitted pulse by having a "1" at input 46 from the lockout circuit 33 while the other input from the NOR-gate 43 is "0." The flip-flop switches to provide a "0" output when the NOR-gate 43 switches to a "1" (echo signal) and thereafter remains at "0" until reset by the next succeeding transmitter pulse. It therefore remains on at "1" during the entire period between the projected transmitted pulse and the received return echo.

This output 49 controls the activation of a constant current source 50 which provides a constant current to a current integrator circuit 51 for the period specified above. This circuit integrates the current, which is a measure of the time, and therefore the distance, travelled by the transmitted acoustic energy pulse from its transmission to its reflection. The integrated current is applied as a voltage to the indicating means or meter 52 which indicates the depth or travel length of acoustic transmission.

Figure 4:
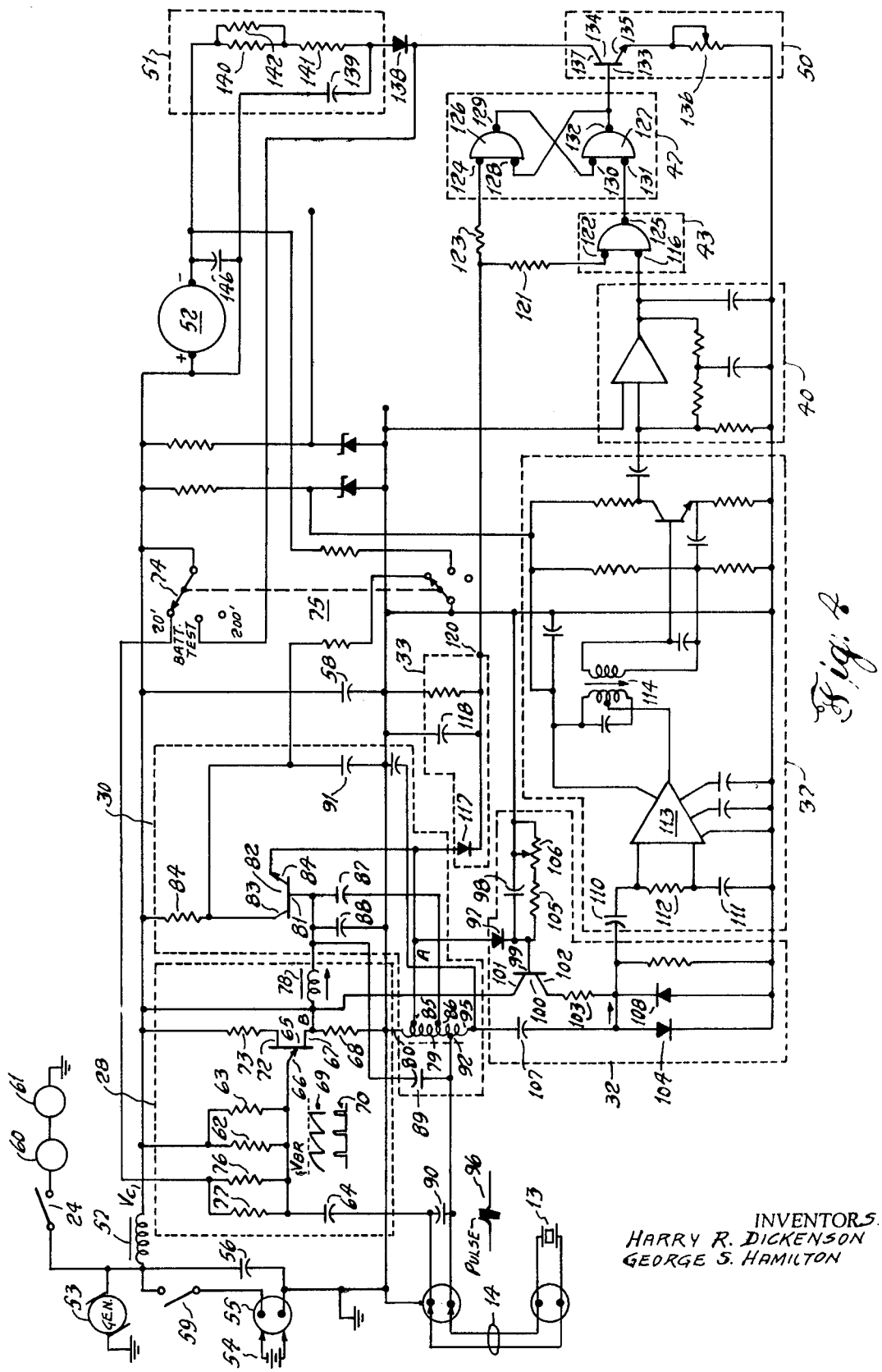
FIG. 4 is an electrical schematic wiring diagram illustrating the embodiment of FIG. 3.

Having described the embodiment with reference to the block diagram a more complete operational description will follow with reference to the wiring schematic of FIG. 4 wherein the depth-determining device derives its source of power either from the ship's own generator 53 or alternately from the battery 54 via jack 55. Where the generator is employed an input $\pi$ filter consisting of capacitor 56, series choke 57 and parallel capacitor 58 are connected between the generator input and ground. This filter arrangement remains in the circuit, however, when the battery 54 is used in place of the generator. Switch 59 places the battery or generator in circuit. Panel lamps 60 and 61 are connected through switch 24 to the battery or generator and serve to properly illuminate the dial face.

The timing circuit 28 is basically a unijunction transistor relaxation oscillator. A unijunction transistor (UJT) has three terminals which are referred to as the emitter, base-one ($B_1$) and base-two ($B_2$). Under normal conditions if the emitter voltage is less than its peak point voltage $V_{BR}$, the transistor is reversed biased and no appreciable current will flow. However, when the applied emitter voltage is equal to the peak point voltage the UJT will turn on and the resistance between the emitter and base one will be very low. The peak point voltage and the supply voltage for the oscillator are related as given by $$V_{BR} = N V_c \text{ (supply)}$$

where $N$ is the intrinsic standoff ratio and can be as high as 0.7 to 0.8. In the event that the supply voltage $V_c$ should change then the peak point voltage will change in proportion thereto, thus fully compensating by altering the charging slope so as to maintain a fixed constant pulse repetition rate. The supply voltage $V_c$ is applied across the combination of parallel resistors 62 and 63 and charging capacitor 64 for the 200 foot ranging. Thus the capacitor 64 is charged through the resistive network thereby determining the time-constant or pulse-repetition rate which, for 200 foot ranging, would be 10 pulses per second (P.P.S.). The capacitor charges until it reaches the peak or firing voltage $V_{BR}$ of the UJT 65 and, since it is connected to the emitter 66 which has been thereby turned on, it will discharge through the emitter, base-one 67 and base resistor 68. When the capacitor or emitter voltage drops below a specific voltage the UJT is turned off and the capacitor again begins to charge as shown at 69. The timing pulse output across resistor 68 is shown below 69 at 70 and is approximately 0.2 milliseconds in duration. Base-two 72 is biased from the supply $V_c$ through its resistor 73. Switch section 74 of ganged switch 75 serves to either introduce resistors 62 and 63 alone for the 200 ft. range or add in parallel thereto resistors 76 and 77 for the 20 ft. range and provide 100 p.p.s. The output of the timing circuit is fed through choke 78 which acts in a fashion similar to an ordinary audio choke to the transmitter oscillator circuit 30.

The power oscillator 30 is a modified Hartley-type oscillator employing a self-coupling coil 79 having a plurality of taps with one end 80 connected to ground. The pulses are applied to the base 81 of transistor 82 which serves as the gain element and whose collector 83 is biased through resistor 84 from the supply $V_c$. The timing pulse triggers the oscillator into an oscillating state by turning the transistor 82 on and generating an oscillatory voltage around the coop comprising base 81, emitter 84, low coil tap 85, a portion of the coil tap 86, capacitor 87. This in turn causes the feedback to induce high-power oscillation across the entire coil. Capacitor 88 serves to provide matching for the transducer and to tune the coil for the correct frequency range which in this case is approximately 200 kilocycles. Capacitors 89 and 90 also are employed for eliminating noise and matching the transducer. Filter capacitor 91 also provides the necessary RF ground while the high tap output 92 is connected to the transducer through jack 93 cable 14 and plug 94. Another high-potential tap 95 applies the output and the return echo from the transducer to the range attenuator network 32. The previously mentioned interstage choke 78 serves two additional purposes, namely to insure positive firing of the oscillator and quick turnoff, since it is in parallel with capacitor 87 without loading the circuit as a resistor would. The oscillator output waveform is shown at 96 with the timing pulse.

Figure 5A:
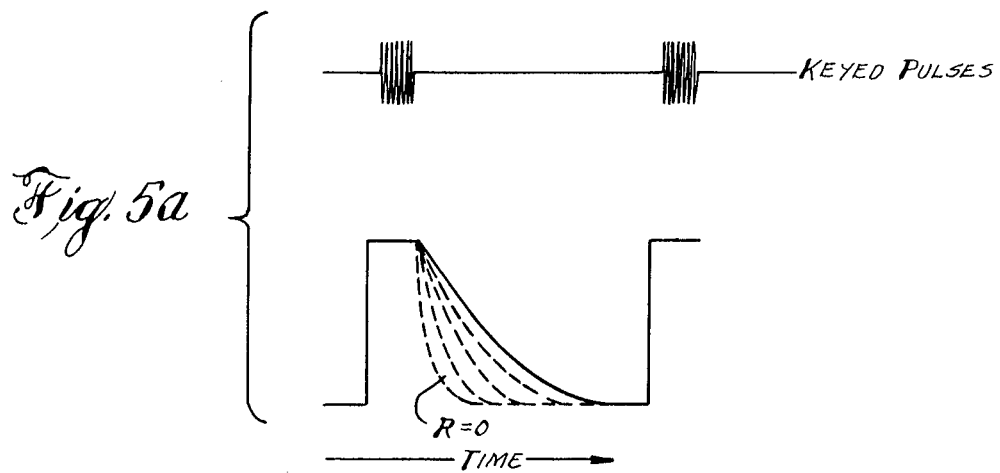
FIGS. 5a and b are graphic representations of various wave shapes within the range-attenuator circuits.
Figure 5B:
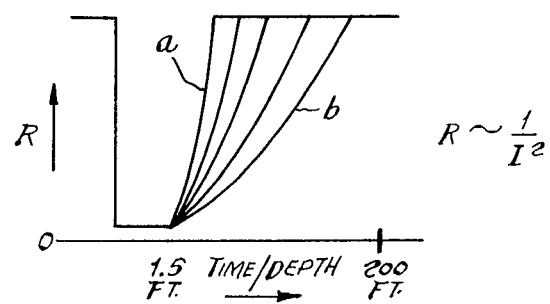

A low-voltage output tap 85 of oscillator coil 79 is connected to the diode 97 of range attenuator 32 where the oscillator pulses are effectively rectified and applied simultaneously to charging capacitor 98 and the base 99 of transistor 100. Since the diode only conducts during pulses of a magnitude sufficient to break it down it will only charge the capacitor during transmitter output pulses. Initially the transmitter pulse will turn or bias transistor 100 on so that a maximum current will flow between the collector 101 (from the supply $V_c$) to the emitter 102 through resistor 103 and diode 104. When the transmitter terminates the pulse the diode 97 turns off and capacitor 98 discharges through series fixed resistor 105 and variable resistor 106 (sensitivity) and through the base 99-emitter 102 of emitter follower 100. The rate of discharge and therefore the current through diode 104 are fixed by the setting of potentiometer 106 with the shortest discharge time being equivalent to a range of 1.5 feet. It is quite clear therefore that the current through diode 104 is a direct function of the setting of resistor 106. FIG. 5a illustrates the current through the diode 104 as related to the keyed pulse for various settings of resistor 106. As is well known, the resistance of a diode is an inverse function of the current therethrough so that the resistance of diode 104 is extremely low at the time the oscillator is keyed and thereafter rises as in FIG. 5b. The shape of the resistance function can be varied by selecting the diode of the particular resistance-current characteristics desired. It is clear from this circuit that the input impedance of the receiver 37 is low during the keyed pulse and rises in accordance with the sensitivity control (potentiometer 106). This permits the attenuation at the receiver input to be selected as a function of time with respect to the transmitter keying and so, to effectively permit receipt of the echo at the receiver only after a set time. Thereby the circuit operates as a depth discriminator such that for observation at shallow depths one would set the circuit to follow curve (a) while for extreme depths curve (b) would be employed since any false or spurious echo from the shallow depths would be attenuated. Intermediate depth selection necessitates the use of the curves or settings between the limits. These curves are only illustrative as a family, since the sensitivity adjustment is continuous and it should be observed that the attenuation is inversely proportional to the range squared. Since it is necessary to provide the receiver with the maximum echo signal, the input is coupled directly to the high output 95 of coil 79 through capacitor 107. Thus, not only is the echo signal applied to the receiver but the keyed transmitted oscillatory pulse as well. Diodes 104 and 108 serve as clamping means, diode 104 for positive limiting and diode 18 for negative limiting. Resistor 109 completes the circuit by providing a resistive output to the receiver input comprising capacitors 110, 111 and input resistor 112.

The receiver 37 employs an integrated amplifier 113 which amplifies the echo signal, applies it to the output interstage transformer 114 whose output is then connected to an RF transistor amplifier 115. Capacitor 116 serves to couple the receiver output to the detector amplifier 40 which is a DC biased circuit and provides an elevated voltage output corresponding to a "1" in logic terminology at all times except when an input signal is present from the receiver. The graphic representation of the detector amplifier 40 logic output is shown in FIG. 6 (a) with reference to the keyed transmitted pulse and the echo as shown in FIG. 6(a). This output is applied to input 116 of NOR-gate circuit 43.

Reference is now made to the lockout circuit 33 wherein it receives the oscillator keyed output from low tap 85 of coil 79 through the diode 117. The detected signal is applied to resistor 118 and a capacitor 119, which comprise an RC network to ground. During keying (transmission) the capacitor 119 is charged and maintains a high potential at its output 120. When the keying pulse terminates, the capacitor effectively discharges through resistor 119 and the output voltage decays in accordance with the RC time constant and is illustrated logically in FIG. 6(c). This logic output is applied via resistor 121 to the other input 122 of NOR-gate 43 and via resistor 123 to the reset input 124 of bistable means 47 which may be an ordinary flip-flop (F—F) circuit. A NOR gate may be simply defined as a logic circuit such that when a signal or positive voltage ("1" state) is present at either or both inputs (116, 122), the output (125) is a negative voltage or a "O." Conversely if both inputs are "O" then the output is a "1." Following this logic operation therefore, the output at 125 of the NOR-gate 43 is a "1" only at the moment when the echo signal is received since the lockout signal has decayed to "O" and the detector 40 output is also "O." Redundancy is avoided since the lockout signal is "1" during the keying pulse and the detector (or receiver) is effectively blocked out.

The bistable means (F—F) 47 consists of a pair of cross coupled logic NOR-gates 126 and 127 connected in DTL logic. When the transmitter is keyed, input 124 (gate 126) is at "1" due to the lockout signal thereby assuring a "O" at the output 129 of this gate as well as at input 130 of gate 127 irrespective of the state of input 128 (gate 126). Therefore, the input 130 (gate 127) is initially at "O" as is the other input 131 which remains at "O" except when the echo signal is received. Thus output 132 (gate 127) and coupled input 128 (gate 126) are both at "1." Since output 132 remains at "1" there is always a "1" at an input to gate 126 providing a "O" at the input 130 of gate 127 and maintaining the "1" at 132. Although the input at 124 decays to "O" after the keying pulse the output at 129 does not switch due to the "1" at 128. The other states remain fixed until the echo signal is received at which time input 131 (gate 127) switches to a "1" causing the output at 132 and input 128 (gate 126) both to switch to "O." In turn output 129 (gate 126) and input 130 (gate 127) change to a "1" state. When the echo signal terminates the output 132 (gate 127) remains at "O" since the input 130 is locked at "1" and remains in this state until the transmitter is again keyed at which instant reset input 124 (gate 126) switches to a "1." This action causes a "O" at 129 and at input 130 (gate 127). With the NOR-gate 43 output at "O" as well as the output at 132 (gate 127) switches to a "1" and the initial conditions are reestablished and the process repeated for the repetitive keying and echo pulses. FIGS. 6 (c-f) show the conditions or states of the various terminals of the bistable means or flip-flop 47. It is clear from the foregoing that the bistable means output terminal 132 provides a "1" output during the entire period between the keying pulse and the return echo and remains at "O" at all other times and therefore is a "measure" of the distance travelled by the transducer projected pulse acoustic signal. The logic output of the bistable means is applied to the base 133 of transistor 134 for turning it on when the output is "1" and off for an "O" output. The emitter 135 is connected in series with scale-adjusting variable resistor 136 to ground while the collector 137 is connected to the supply $V_c$ through diode 138 and integrating capacitor 139. The diode 138 is employed for the standard battery test and so any description thereof has been deleted. Transistor 134 is biased on during the period from keying to the return echo during which period a constant current flows from the supply through capacitor 139, collector 137, emitter 135 and resistor 136 due to the high impedance presented by the collector-emitter of the transistor. This current charges the capacitor 139 which is in parallel connection with series combination of the meter 52, resistor 140, and resistor 141. Thermister 142 is added in parallel across resistor 140 to provide temperature compensation for the transistor to insure a constant fixed current. The constant current source eliminates any problems encountered due to changes or variations in supply voltage such as might occur in switching from the generator to the ship's battery supply. The capacitor 139 charges under the influence of a constant current and commences to discharge when the return echo is received. It discharges through the resistive leg which includes the meter 52. Thus this circuit is essentially an RC integrator and its components are selected to provide a relatively long time constant. FIG. 7 illustrates the voltages present for several time conditions of echo return. The curves and values are attained in each case after several charges and discharges of the capacitor in order that it might stabilize at a new starting level. Curve 143 indicates the voltage for the return echo illustrated in the previous Figures and can be considered intermediate while curve 144 indicates a relatively deep bottom evidenced by the long charging period. Curve 145 indicates a shallow bottom since the charge is short and the discharge relatively long. It should be clear that the meter effectively indicates the ratio or proportion of the transit time (between transmission and echo) and the remainder of the pulse cycle period. Thus by changing the range scale from 200 ft. to 20 ft. when timing resistors 76 and 77 are added, the meter 52 scale is unaffected since the pulse cycle period is proportionally changed. In this regard it should be observed that adjusting resistor 136 is set by operating the depth device in a fixed known depth of 200 feet and adjusting to a full scale deflection therefor. The meter will also fully deflect at 20 feet when the range is set for 0–20 feet without further adjustment since the pulse period has been proportionally altered (0.1–0.01 sec.). With the meter reading the integrated values, as indicated, it has been found necessary to provide capacitor 146 in order to smooth out the applied voltage and to steady the meter. It has been found that even with abrupt changes in depth, the meter provides a steady proper indication accurately following such changes without oscillating or indicating false readings.

It should be understood, of course, that the foregoing disclosure relates to only a preferred embodiment of the invention and that numerous modifications or alterations may be made therein without departing from the spirit and the scope of the invention as set forth in the appended claims.

We claim:

1. An ultrasonic ranging device including a transducer which comprises:

means for receiving and generating a series of recurrent acoustic transmission pulse applying the same to said transducer and propagating the same into water and receiving an echo signal between successive pulses, said means including:

an oscillator having a trigger input for activating said oscillator, a transformer output coupling means having said transducer connected to one end thereof, a pulse timing circuit connected to said trigger input for providing periodic pulses, a a receiver having its input connected to said transformer coupling means, an output variable resistive element whose resistance is dependent on the current therethrough, having one end connected to said transformer coupling means, a source of current connected to said one end of said variable resistive element through a current control means dependent on the signal current applied to its control element which is connected to said transformer coupling means and to, a charge/discharge network having a selectable time constant, said variable resistive element being connected across the input of said receiver whereby the attenuation at said receiver will be high for the duration of said oscillator output and decrease with time thereafter, a constant current generator having its output connected to, a current integrator whose output is coupled to, a meter for indicating the average current, Unambiguous switch means connected intermediate the output of said receiving and generating means and said current generator for initiating said current generator when said pulse is generated and terminating when said echo is received, whereby said average current will indicate the transit distance of said propagated pulses.

2. The device according to claim 1 wherein said variable resistive element is a diode and said current control means is a transistor having an emitter, a collector and a base control electrode, said collector connected to said current source, said emitter connected to said diode.

3. The device according to clam 2 further including rectifier means connected intermediate said transformer coupling means and said base electrode.

4. The device according to claim 3 wherein said unambiguous switch means comprises:

lockout means for providing an output of one level for the duration of the output of said oscillator and thereafter decaying to zero, and having its input connected to said transformer coupling means, a detector having its input connected to the output of said receiver, a NOR gate having a pair of inputs and an output, one of said inputs connected to the output of said detector and the other input connected to the output of said lockout means, bistable flip-flop means having a pair of inputs and an output connected to said constant current generator for controlling the activation thereof, one input connected to the output of said NOR gate and the other input connected to the output of said lockout means.

5. The device according to claim 4 wherein said lockout means comprises;

a unidirectional element connected in parallel with both a resistor and a capacitor.

6. The device according to claim 5 wherein said bistable flip-flop comprises a pair of cross coupled NOR gates.

7. The device according to claim 6 wherein said charge/discharge network includes a second capacitor connected in parallel with a variable resistor.

* * * * *